United States Patent [19]

Suzuki et al.

[11] Patent Number: 5,003,326
[45] Date of Patent: Mar. 26, 1991

[54] COLOR IMAGE PROCESSING METHOD AND APPARATUS

[75] Inventors: Akio Suzuki, Tokyo; Masaharu Ohkubo; Yoshihiro Takada, both of Yokohama, all of Japan

[73] Assignee: Canon Kabushiki Kaisha, Tokyo, Japan

[21] Appl. No.: 379,177

[22] Filed: Jul. 13, 1989

Related U.S. Application Data

[63] Continuation of Ser. No. 277,515, Nov. 29, 1988, Pat. No. 4,855,765, which is a continuation of Ser. No. 84,012, Aug. 11, 1987, abandoned.

[30] Foreign Application Priority Data

Aug. 13, 1986 [JP] Japan .................................. 61-188772
Aug. 13, 1986 [JP] Japan .................................. 61-190034

[51] Int. Cl.$^5$ ...................... G03G 15/01; H04N 1/40; G01D 15/06
[52] U.S. Cl. .................................... 346/154; 355/326; 358/80

[58] Field of Search .................. 346/154; 358/80, 280; 382/57; 355/326

[56] References Cited

U.S. PATENT DOCUMENTS

| | | | |
|---|---|---|---|
| 4,204,728 | 5/1980 | Goshima et al. | 355/4 |
| 4,467,348 | 8/1984 | Fujii et al. | 358/78 |
| 4,538,182 | 8/1985 | Saito et al. | 358/280 |
| 4,590,515 | 5/1986 | Wellendorf | 358/80 |

Primary Examiner—Donald Griffin
Attorney, Agent, or Firm—Fitzpatrick, Cella, Harper & Scinto

[57] ABSTRACT

A color image processing method comprising the steps of extracting a particular color signal of three color image signal components from an input color image signal; converting the particular color to another designated color; designating the particular color and the designated color; and forming a color image on the basis of the converted color image signal.

22 Claims, 3 Drawing Sheets

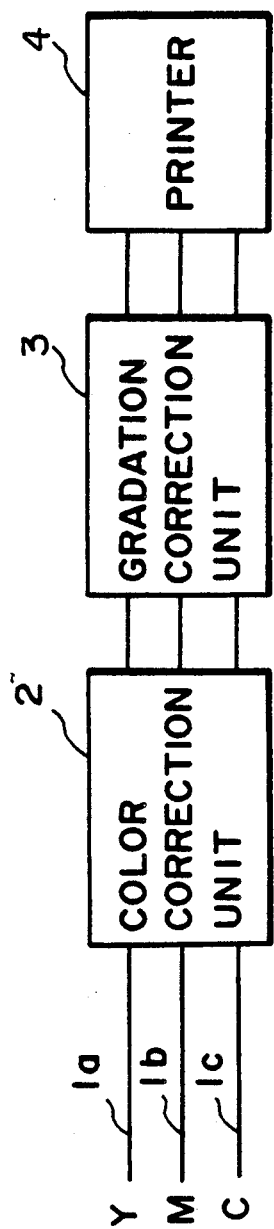
F I G. 2
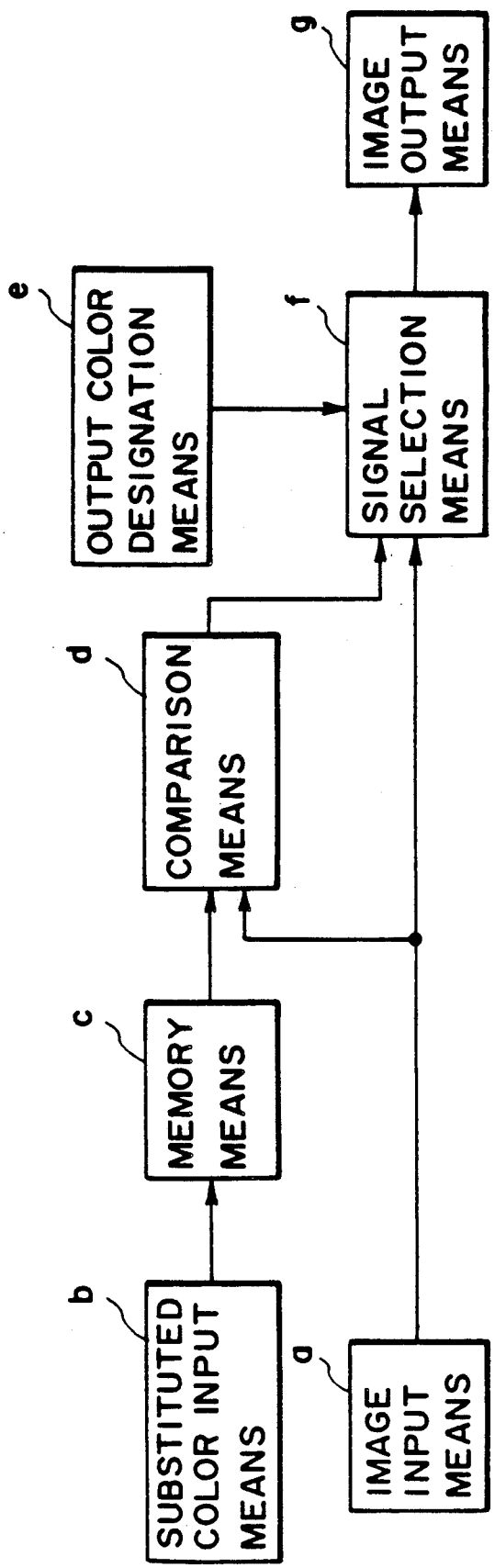
F I G. 3

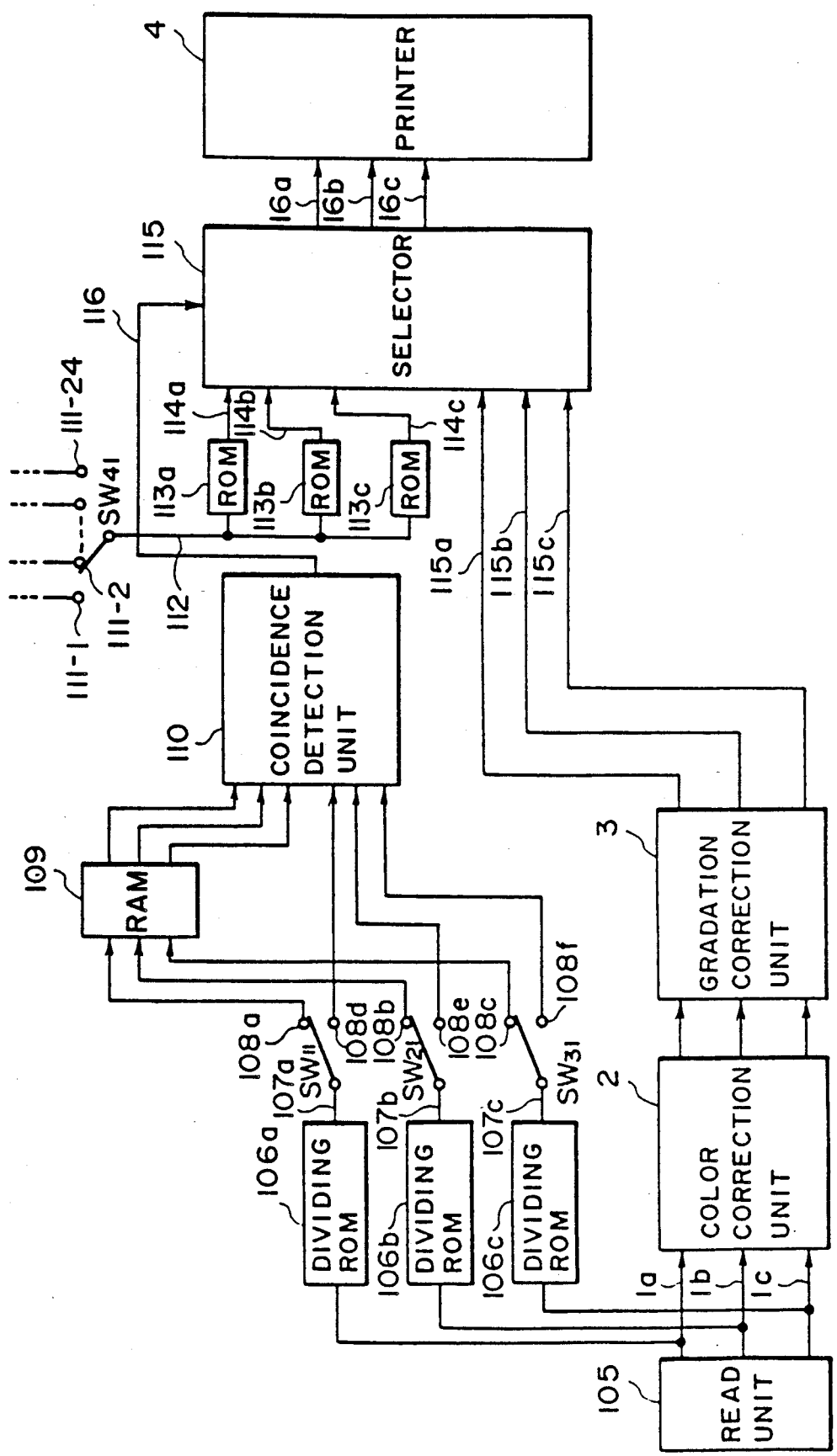
F I G. 4

COLOR IMAGE PROCESSING METHOD AND APPARATUS

This application is a continuation of application Ser. No. 07/277,515, filed Nov. 29, 1988, now U.S. Pat. No. 4,855,764, issued Aug. 8, 1989, which is a continuation of application Ser. No. 07/084,012, filed Aug. 11, 1987 now abandoned.

FIELD OF THE INVENTION

This invention relates to a color image processing method and apparatus which processes a color image signal to form a color image.

BACKGROUND OF THE INVENTION

Color image recording apparatus that record color image information using a recording method such as ink jet, heat transfer or electrophotography are well known.

FIG. 2 is a block diagram for processing a signal in a color image recording apparatus of this type. An image reader or an image data storage, not shown, outputs three color image signals $1a$, $1b$ and $1c$ indicative of yellow, magenta and cyan, respectively, which are input to a color correction unit 2 which performs a color correction such as masking on these input signals. A gradation correction unit 3 performs a gradation correction on the corrected color signals from color correction unit 2. A printer 4 forms yellow, magenta and cyan images in accordance with the corrected gradation signals and records a color image.

An apparatus of this type is most desired to reproduce a color faithful to that of an input image. In some cases, it may be desired to output an image by changing a color of the input image. For example, in the design of a poster, it may be desired to reproduce an original image in various colors. Especially, it is strongly desired to change only a particular color portion of the original image to another color to output the resulting image.

U.S. Pat. No. 4,204,728 discloses an electronic color photography reproduction apparatus (color electrophotographic copying apparatus) which focuses an optical image passing through R-, G- and B- filters onto a photosensitive medium and develops the same using developers of cyan, magenta and yellow. In such related art, however, not only the particular color in the original image but also other colors containing the color components (Y, M, C) contained in the particular color may be changed. Even in a color image recording apparatus which temporarily changes a color image into color component signals and records the colors, if colors not corresponding to three color (yellow, magenta and cyan) signals are printed with the yellow, magenta and cyan color signals, an image different in color from the input image can be produced. For example, if magenta, cyan and yellow are printed with yellow, magenta and cyan signals, respectively, the red portion of yellow+magenta, the blue portion of magenta+cyan and the green portion of cyan+yellow will be reproduced with the blue of magenta+cyan+yellow will be reproduced with the blue of magenta+cyan, the green of cyan+yellow, and the red portion of yellow+magenta, respectively. However, according to such method, all colors of the input image except for three monochromatic elements, yellow, magenta and cyan, will be reproduced in different colors from those of the original image, so that it is impossible to replace only a particular color with another.

U.S. Pat. No. 4,538,182 discloses a color reproduction apparatus which reproduces a plurality of particular colors, for example, two colors (red and black) or three colors (red, blue and black), in which the original red will be changed to black or the original black will be changed to red. However, it is impossible to change a delicate color including a plurality of color components to another or to change a color to a plurality of delicate color components.

SUMMARY OF THE INVENTION

It is an object of this invention to provide a color image processing method and apparatus which eliminates the aforementioned prior art drawbacks.

It is another object of this invention to provide a color image processing method and apparatus which can replace only a selected particular color portion in an input color image signal with a desired designated color.

It is still another object of this invention to provide a color image processing method and apparatus which can read a predetermined original color, store the value of signals representing the color components of the predetermined color, and replace the color component signals corresponding to the stored signal values with desired designated colors.

These and other objects of this invention will be apparent from the following description when taken in conjunction with the drawings.

BRIEF DESCRIPTION OF THE DRAWINGS

FIG. 2 is a signal block diagram of a related art.

FIG. 3 is a block diagram showing the basic structure of a second embodiment of this invention; and FIG. 4 is a block diagram showing the circuit structure of the second embodiment.

DETAILED DESCRIPTION OF THE PREFERRED EMBODIMENT

Figure 1:
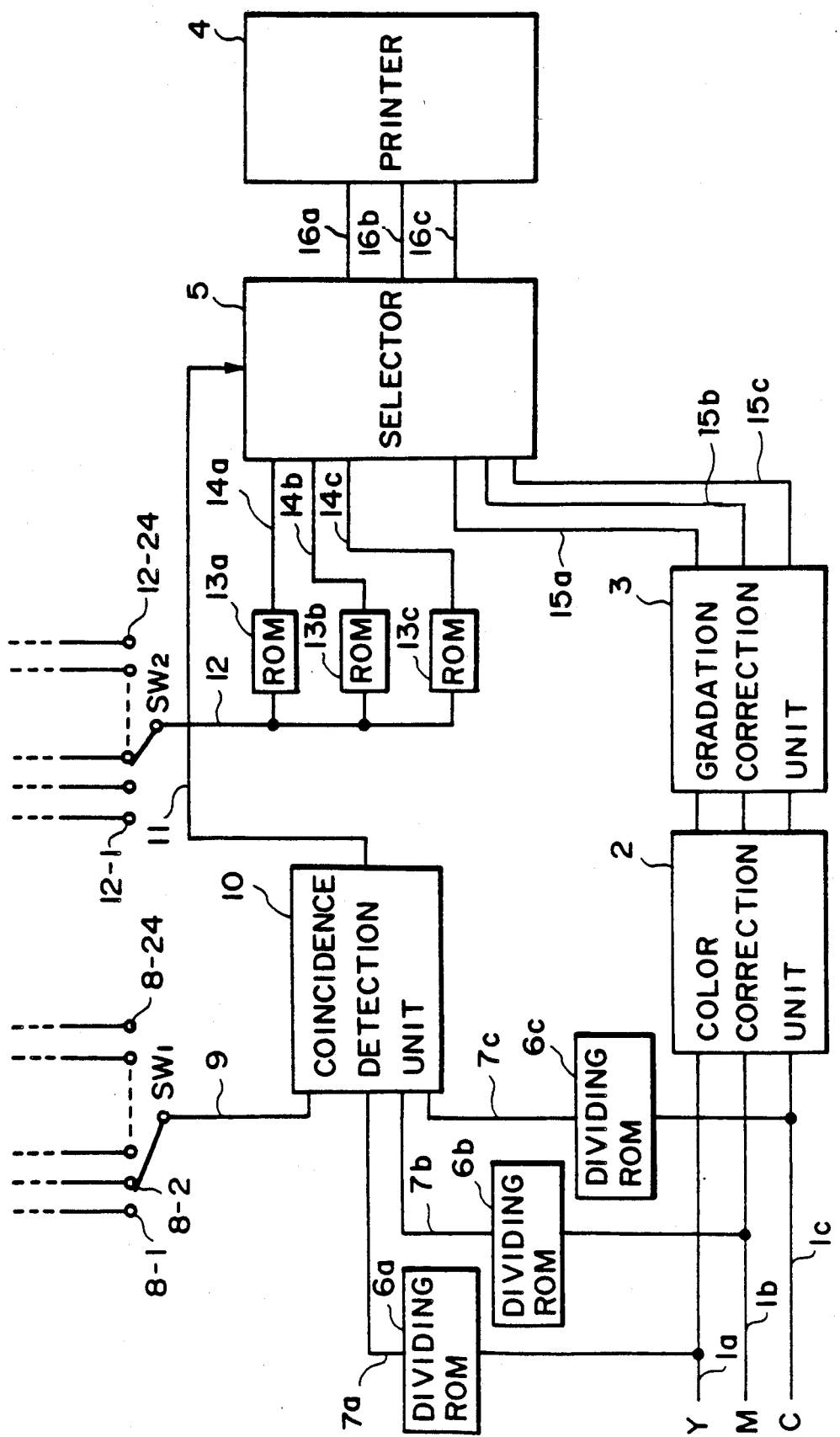
FIG. 1 is a signal block diagram of the inventive embodiment.

A first embodiment of this invention will now be described with reference to the drawings.

FIG. 1 is a signal processing block diagram of the embodiment. Like reference numerals denote like elements or parts in FIGS. 1 and 2.

Three 6-bit color signals $1a$, $1b$ and $1c$ indicative of yellow, magenta and cyan, respectively, are input to a selector 5 via a color correction unit 2 and a gradation correction unit 3. Signals $1a$-$1c$ are divided by 16 at dividing ROMs $6a$, $6b$ and $6c$ to be converted to 4-bit signals $7a$, $7b$ and $7c$, respectively. Namely, if a color represented by three color signals is represented by (Y, M, C), there are a total of $64^3 = 262,144$ colors (0, 0, 0)-(63, 63, 63) represented by $1a$-$1c$, and there are a total of $16^3 = 4096$ converted colors (0, 0, 0)-(15, 15, 15), represented by $7a$-$7c$.

A switch SW1 selects a color in the input image to be replaced with another and can one among 24 colors herein. Terminals 8-1 to 8-24 are each given 12-bit data corresponding to a separate one of 24 colors so that the user can select a desired color freely among them. Each 12-bit data corresponding to a separate one of the 24 colors is determined in advance as follows.

For example, assume that the user selects orange and connects switch SW1 to terminal 8-2. If a combination of signals 7a–7c representing orange is, for example, (5, 6, 2), a 12-bit signal $$\underbrace{0101}_{5}\underbrace{0110}_{6}\underbrace{0010}_{2}$$

corresponding (5, 6, 2) is output from terminal 8-2.

In this way, 12-bit signals are determined corresponding to respective colors and stored in a ROM, not shown, and applied to the corresponding terminals.

A signal 9 selected by SW1 among such 12-bit signals is input to a coincidence detection unit 10 which also receives signals 7a–7c after the division Coincidence detection unit 10 includes an Exclusive-Or gate which compares 12 bits of signal 9 and 12 bits (4×3) of signals 7a–7c on a bit-by-bit basis to output a signal 11 which will become high when all these compared bits coincide and will become low otherwise.

Switch SW2 selects which color a particular color of the original image should be changed to. To this end, there are also 24.colors prepared herein. Terminals 12-1 to 12-24 are given different 4-bit data outputs, the number of bits of which is determined in accordance with the number of colors selectable.

The signal 12 selected by SW2 is input as address data to ROMs 13a–13c. Printer drive signals necessary for outputting the selected color are stored in the corresponding ROMs. For example, assume that a color be replaced and printed with green. In order to print this green, when three color signals to be input to the printer are (40, 20, 50) (assume that each color is one of 64 gradations 0–63.), the ROM outputs 14a–14c obtained when green is selected by SW2 are set so that 14a, 14b and 14c are 40, 20, 50, respectively. In this way, three color drive signals corresponding each color are stored in ROMs 13a–13c.

The respective ROM outputs 14a–14c are input to selector 5 together with the respective output 15a–15c of gradation correction unit 3. Selector 5 produces at its outputs 16a–16c signals 15a–15c when signal 11 is low and signals 14a–14c when signal 11 is high.

Selector outputs 16a–16c are input to printer 4 which forms yellow, magenta and cyan images in accordance with these signals and records a color image.

Description will now be made of the case in which such apparatus replaces only orange color of an input image with green and outputs the resultant image.

The user sets SW1 to orange and SW2 to green. As described above, signal 9 is 010101100010, and signal 12 is a 5-bit signal corresponding to green. If an input image is not orange, signals 7a–7c will not coincide with signal 9, so that the output 11 of coincidence detection unit 10 becomes low. Therefore, selector 5 outputs, as outputs 16a–16c, signals 15a–15c processed in a normal manner which outputs are supplied to the printer to thereby perform printing.

If the input image becomes orange, signals 7a–7c will coincide with signal 9 and the output 11 of coincidence detection unit 10 becomes high. Selector 5 then supplies outputs 14a–14c of ROMs 13a–13c to printer 4 to print green.

In this way, an image can be output in which only orange of the input image is replaced with green. By freely changing SW1 and SW2, the color of an image portion to be replaced and a color to be printed therefor can be selected freely.

While in the above embodiment, dividing ROMs 6a–6c which divide corresponding 6-bit signals by 16 to output 4-bit signals are used, only the 4 most significant bits of the 6-bit signals may be extracted. Alternatively, any means may be used which compresses the 6-bit signals to corresponding ones of bits fewer than 5.

Instead of a logic element such as an Exclusive-Or gate, the coincidence detection unit may be a ROM which receives signal 9 as the most significant address bits, signals 7a–7c as the least significant address bits, stores 1 at addresses where the most and least significant bits are equal, 0 at addresses otherwise, and outputs the stored value as a signal 11.

So long as printer 4 can form a color image in accordance with signals 16a–16c, it may be any of ink jet, heat transfer and electronic photography types.

While in the above embodiment the printer has been described as combining three colors yellow, magenta and cyan to form a color image, it may combine four or more colors which include black in addition to those three colors. Otherwise, it may be of the type which combines two colors such as red and black.

While in the above embodiment the kind of colors to be replaced and the kind of colors therefor to be printed are each shown as being 24 colors, they are not limited to them and any kinds of colors may be prepared.

Especially, if white and black are included in these colors, the following advantages will be obtained.

If white is included in colors to be replaced, for example, output images with various colors in their backgrounds can be obtained from the original picture with no colored background. If black is included, output images can be obtained which have characters of various colors from the original picture with black characters.

If white is included in colors to be printed, a picture can be output with no print in a portion corresponding to the original particular color portion and the no-print portion can be conveniently coated later with a color such as gold or silver which cannot be expressed by the printer. If black is included, it will be convenient to reverse the negative and positive of a white and black image.

As described above, according to this embodiment, when 3 combined input color image signals become predetermined values, predetermined color signals are output to the printer to output an image in which only any particular portion of the input image is replaced with any designated color.

A second embodiment of this invention will now be described. It includes image input means for providing an image to be recorded, in a combination of color signals, replaced-color input means for providing in a combination of color signals, a designated replaced color of the image to be recorded, memory means for storing the combination of color signals supplied by the replaced color input means, comparison means for comparing the combination of color signals read out of the memory means and the combination of color signals supplied by the image input means to output a signal representing a coincidence when both the combinations coincide, output color designation means for designating an output color substituted for the replaced color in a combination of color signals, signal selection means for selectively outputting a color signal from the image input means or a color signal from the output color designation means in accordance with the output from the comparison means, and image output means for forming an image of a plurality of colors in accordance with the output of the signal selection means.

Colors of an origianl document to be replaced are read and stored in advance. When signals indicative of the stored colors do not coincide with three color input image signals, an input image signal subjected to regular color and gradation correction is output to the recording unit while when they coincide, the previously selected color signal is output to the recording unit. Therefore, an image in which only a particular color portion of the input image is replaced with another particular color can be output to a recording medium.

Now, the second embodiment of this invention will now be described in more detail with reference to FIGS. 3–4.

FIG. 3 shows the basic structure of the second embodiment which includes image input means a for providing an image to be recorded, in a combination of color signals, replaced-color input means b for providing, in a combination of color signals, a designated replaced color of the image to be recorded, memory means c for storing the combination of color signals supplied by the replaced-color input means, comparison means d for comparing the combination of color signals read out of the memory means c and the combination of color signals supplied by the image input means a to output a signal representing a coincidence when both the combinations coincide, output color designation means e for designating an output color substituted for the replaced color in a combination of color signals, signal selection means f for selectively outputting a color signal from the image input means a or a color signal from the output color designation means e in accordance with the output from the comparison means, and image output means such as a color printer g for forming an image of a plurality of colors in accordance with the output of the signal selection means f.

FIG. 4 shows the circuit structure of the second embodiment. In FIGS. 1 and 4, like reference numeral denote like components.

In FIG. 4, a read unit 105 reads a color image in an original document, a color film or the like, using an image sensor such as a CCD (charge coupled device) provided therein and outputs it as three color signals of Y. M. C. respectively, shown by 1a, 1b, 1c. Dividing ROMs (read only memories) 106a, 106b, 106c, divides, by 16, 6-bit color signals 1a, 1b, 1c, namely, converts same to corresponding 4-bit signals. Three switches SW11, SW21 and SW31, ganged as a unit, select a destination to which output signals 107a, 107b, 107c from ROMs 106a, 106b, 106c, are connected to designate color to be changed. A RAM (random access memory) 109 temporarily stores signals 107a, 107b, 107c selectively supplied from dividing ROMs 106a–106c via corresponding switches SW11–SW31. Coincidence detection unit 110 compares the signals read from RAM 109 with the signals, as they are, supplied from dividing ROMs 106a–106c to output a coincidence signal 116 when coincidence holds. An operation switch SW41 designates a color to be recorded among, for example, 24 colors, after color substitution. ROMs 113a, 113b, 113c output three corresponding combined color signals 114a–114c corresponding to a designated color by switch SW41. The selection means including a selector 115 outputs to printer 4 the signals 114a, 114b, 114c from ROMs 113a, 113b, 113c when it receives a high or coincidence signal 116 from coincidence detection unit 110 and outputs signals 115a, 115b, 115c of gradation correction unit 3 when it receives no coincidence signal.

In operation, in a color designation mode (1) the user causes read unit 105 to read only a color portion to be replaced in an original document. Three 6-bit color (yellow, magenta and cyan) signals 1a–1c representing the color components of the read color are divided by 16 at dividing ROMs 106a–106c to be converted to 4-bit signals 7a–7c. Namely, if a color to be represented by three color signals is (Y, M, C), there are a total of $64^3=262144$ colors (0, 0, 0)–(63, 63, 63), shown by 1a–1c in the decimal notation, and there are a total of $16^3=4096$ colors (0, 0, 0)–(15, 15, 15) represented by signals 107a–107c after conversion by dividing ROMs 106a, 106c.

In the color designation mode (1), switches SW11, SW21, SW31 are connected to contacts 108a, 108b, 108c and a total of 12 data bits represented by signals 107a–107c from ROMs 106a–106c are stored in RAM 109.

In the color designation mode (2), the user selects, by switch SW41, an output color to replace the original color. Namely, this switch SW41 selects that output color among 24 colors prepared in advance. Switch terminals 111-1 to 111-24 output different 4-bit data, the number of bits of which is determined in accordance with the number of colors to be selected A 4-bit signal 112 selected by switch SW41 is input as address data to ROMs 113a, 113b, 113c which store printer drive signals necessary for outputting the selected color.

For example, assume that the replaced color portion be printed with green. In order to print this green, when three color signals to be input to printer 4 are (40, 20, 50), each color being one of 64 gradations 0–63, data is stored in advance in ROMs 113a, 113b, 113c so that the outputs 114a, 114b, 114c of ROMs 113a, 113b, 113c obtained when green is selected by SW41 are "40", "20", "50", respectively.

In this way, three color drive signals corresponding to a respective one of colors are stored in ROMs 113a–113c and outputs 114a–114c corresponding to selective signal 112 form switch SW41 are input to selector 115.

When a print start button, not shown, is pressed to enter a print mode, the original document is read by read unit 105 and three color signals 115a–115c corrected normally with respect to color and gradation by color and gradation correction units 2 and 3 are input to selector 115.

On the other hand, since in the print mode the ganged switches SW11, SW21, SW31 are connected to contacts 108d, 108e, 108f, respectively, the data read from the document and divided at ROMs 106a–106c are input unchanged as 107a–107c to coincidence detection unit 110. At the same time, the data on a color to be replaced and read already in the color selective mode (1) is read from RAM 109 to be compared with the document data 107a–107c. Coincidence detection circuit 110 compares signals from RAM 109 and signals 107a–107c from the document on a bit-by-bit basis, using its internal Exclusive-Or gate, not shown, which outputs to selector 115 a coincidence signal 116 which becomes high when all the compared bits coincide and low otherwise.

Selector 115 outputs to printer 4 the signals 114a–114c from ROMs 113a–113c when signal 116 is high and outputs to printer 4 the signals 115a–115c from gradation correction unit 3 when the coincidence signal 116 is low.

These signals 116a–116c output from selector 115 are input to color printer 4 which may be an ink jet printer, a heat transfer printer of an electronic photography printer to reproduce a full color image printed in yellow, magenta and cyan.

As a result, when the color of the document read in the print mode does not coincide with the color read in the color designation mode (1) and stored in RAM 109, an image formation is performed using signals subjected to normal color and gradation corrections while when they coincide, an image containing the color designated in the color designation mode (2) is printed. In this way, only a particular color portion in the document read in the color designation mode (1) can be replaced by a desired color designated in the color designation mode (2) and output.

While in the above embodiment, the dividing ROMs 106a–106c which divide 6-bit signals by 16 and outputs 4-bit signals are used, only the most significant 4 bits of each of the 6-bit signals may be output. Alternatively, any means which can compress 6-bit signals to ones of bits fewer than 5 may be used.

If the input image signals as they are should be input to RAM 109 without compression, possible slight changes in the input signals would prevent part of a color designated to be replaced from being replaced, so that it may be desirable to perform an appropriate compression.

Instead of using a logic device such as an Exclusive-Or gate, the coincidence detection unit 110 of FIG. 4 may include a ROM in which the signals from RAM 109 are input to the most significant address bits and the signals from original document are input to the least significant address bits, "1" is stored in advance to addresses where the most and least significant bits are equal, "0" is stored in advance in addresses where the most and least significant bits are not equal, and data "1" or "0" is output as a signal 116 to selector 115.

While in this embodiment the printer 4 has been described as combining three colors yellow, magenta and cyan to form a color image, it may combine four or more colors which include black in addition to those three colors. Otherwise, it may be of the type which combines two colors such as red and black.

While in the above embodiment the kind of colors which can be selected in the color designation mode (2) is shown as 24 colors, it is not intended in a limitative sense and any kinds of colors may be prepared. Especially, if white and black are included in these colors, the following advantages will be obtained. For example, if white is included in colors to be printed, a picture can be output with no print in a portion corresponding to the original particular color portion and the no-print portion can be conveniently coated later with a color such as gold or silver which cannot be expressed by the printer. If black is included, it will be convenient to reverse the negative and positive of a white and black image.

As described above, according to the second embodiment of this invention, a color portion to be replaced in the original document is read and stored in advance. When the stored color signals do not coincide with three color input image signals, the input image signals subjected to regular color and gradation corrections are output to the record unit while when they coincide, the color signals selected in advance are output to the record unit. Therefore, an image in which a particular color portion in the image is replaced with another designated color can be output to a recording medium.

This invention is not limited to the first and second embodiments described above and may be applied and modified in various forms without departing from the scope of the attached Claims.

What is claimed is:

1. A color image processing apparatus comprising:
   supply means for supplying a color image signal corresponding to an original image;
   process means for processing the color image signal supplied by said supply means, said process means performing a color correction process on the color image signal;
   determination means for determining, by using the color image signal supplied by said supply means, whether or not a predetermined color is included in the original image, said determination means performing such determination by using the color image signal not yet processed by said process means; and
   conversion means for converting into a second color any of the predetermined color determined by said determination means as being in the original image.

2. An apparatus according to claim 1, wherein said supply means further comprises original image conversion means for converting the original image into the color image signal.

3. An apparatus according to claim 1, further comprising first designation means for manually designating the predetermined color.

4. An apparatus according to claim 3, wherein said first designation means designates the predetermined color by designating a desired color in the original image.

5. An apparatus according to claim 1, further comprising second designation means for manually designating the second color.

6. An apparatus according to claim 1, further comprising a memory for storing color image data which represents the second color.

7. An apparatus according to claim 6, wherein said conversion means in one which substitutes the color image signal processed by said process means for the color image data stored in said memory.

8. An apparatus according to claim 1, wherein said determination means further comprises:
   a data memory for storing color image data which represents the predetermined color; and
   a judgment circuit for judging whether the color image data stored in said data memory coincides with the color image signal not yet processed by said process means.

9. A color image processing apparatus comprising:
   supply means for supplying a color image signal corresponding to an original image;
   process means for processing the color image signal supplied by said supply means, said process means performing a gradation correction process on the color image signal;
   determination means for determining, by using the color image signal supplied by said supply means, whether or not a predetermined color is included in the original image, said determination means performing such determination by using the color image signal not yet processed by said process means; and conversion means for converting into a second color, any of the predetermined color determined by said determination means as being in the original image.

10. An apparatus according to claim 9, wherein said supply means further comprises original image conversion means for converting the original image into the color image signal.

11. An apparatus according to claim 9, further comprising first designation means for manually designating the predetermined color.

12. An apparatus according to claim 11, wherein said first designation means designates the predetermined color by designating a desired color in the original image.

13. An apparatus according to claim 9, further comprising second designation means for manually designating the second color.

14. An apparatus according to claim 9, further comprising a memory for storing color image data which represents the second color.

15. An apparatus according to claim 14, wherein said conversion means is one which substitutes the color image signal process by said process means for the color image data stored in said memory.

16. An apparatus according to claim 9, wherein said determination means further comprises:
a data memory for storing color image data which represents the predetermined color; and
a judgment circuit for judging whether the color image data stored in said data memory coincides with the color image signal not yet processed by said process means.

17. A color image copying apparatus comprising:
color image read means for converting an original color image into a color image signal;
storage means for storing color image data converted from the original color image;
extraction means of extracting a portion corresponding to the color image data stored in said storage means from the color image signal converted by said color image read means;
conversion means for converting the color image signal according to the portion extracted by said extraction means into color image data according to a second color; and
a color printer for printing an image according to the color image signal converted by said conversion means.

18. An apparatus according to claim 17, wherein said color printer prints the image with yellow, magenta and cyan.

19. An apparatus according to claim 17, wherein said storage means stores the color image signal converted by said image read means.

20. An apparatus according to claim 17, wherein said extraction means further comprises comparison means which compares the color image signal converted by said image read means with the color image data stored in said storage means.

21. An apparatus according to claim 17, further comprising designation means which manually designates the second color.

22. An apparatus according to claim 17, wherein said conversion means includes substitution means which substitutes the color image signal according to the extracted portion for the color image data according to the second color.

* * * * *

UNITED STATES PATENT AND TRADEMARK OFFICE
CERTIFICATE OF CORRECTION

PATENT NO. : 5,003,326

DATED : March 26, 1991

INVENTOR(S) : AKIO SUZUKI, ET AL.

It is certified that error appears in the above-identified patent and that said Letters Patent is hereby corrected as shown below:

ON THE TITLE PAGE:

IN [63] RELATED U.S. APPLICATION DATA

"No. 4,855,765" should read --No. 4,855,764--.

COLUMN 1

Line 61, line should be deleted.

COLUMN 2

Line 43, "EMBODIMENT" should read --EMBODIMENTS--.
Line 61, "can one" should read --can select--.

COLUMN 3

Line 7, "corresponding (5, 6, 2)" should read --corresponding to (5, 6, 2)--.
Line 13, "division" should read --division.--.
Line 38, "output 15a-15c" should read --outputs 15a-15c--.

COLUMN 5

Line 3, "origianl" should read --original--.
Line 39, "numeral" should read --numerals--.
Line 47, "divides," should read --divide,--.
Line 48, "converts" should read --convert--.
Line 53, "color" should read --a color--.

UNITED STATES PATENT AND TRADEMARK OFFICE
CERTIFICATE OF CORRECTION

PATENT NO. : 5,003,326

DATED : March 26, 1991

INVENTOR(S) : AKIO SUZUKI, ET AL.

It is certified that error appears in the above-identified patent and that said Letters Patent is hereby corrected as shown below:

COLUMN 6

Line 11, "$64^3$=262144 colors" should read --$64^3$=262,144 colors--.
    Line 15, "106a, 106c." should read --106a-106c.--.
    Line 44, "form" should read --from--.

COLUMN 7

Line 5, "of" should read --or--.
    Line 20, "outputs" should read --output--.

COLUMN 8

Line 7, "Claims." should read --claims.--.
    Line 44, "in" should read --is--.

COLUMN 9

Line 24, "process" (first occurrence) should read --processed--.

UNITED STATES PATENT AND TRADEMARK OFFICE
CERTIFICATE OF CORRECTION

PATENT NO. : 5,003,326

DATED : March 26, 1991

INVENTOR(S) : AKIO SUZUKI, ET AL.

It is certified that error appears in the above-identified patent and that said Letters Patent is hereby corrected as shown below:

COLUMN 10

Line 5, "of" should read --for--.

Signed and Sealed this

Twenty-ninth Day of December, 1992

Attest:

DOUGLAS B. COMER

*Attesting Officer*     *Acting Commissioner of Patents and Trademarks*